United States Patent [19]

Kohler

[11] Patent Number: 4,828,092

[45] Date of Patent: May 9, 1989

[54] FRICTION CLUTCH AND METHOD OF MAKING A DIAPHRAGM SPRING THEREFOR

[75] Inventor: Helmut Kohler, Bühlertal, Fed. Rep. of Germany

[73] Assignee: LuK Lamellen und Kupplungsbau GmbH, Bühl, Fed. Rep. of Germany

[21] Appl. No.: 125,726

[22] Filed: Nov. 30, 1987

Related U.S. Application Data

[63] Continuation of Ser. No. 896,118, Aug. 12, 1986, abandoned, which is a continuation of Ser. No. 833,569, Feb. 24, 1986, abandoned, which is a continuation of Ser. No. 588,750, Mar. 12, 1984, abandoned.

[30] Foreign Application Priority Data

Mar. 12, 1983 [DE] Fed. Rep. of Germany ....... 3308953
Mar. 12, 1983 [DE] Fed. Rep. of Germany ....... 3308955

[51] Int. Cl.$^4$ .......................................... F16D 13/44
[52] U.S. Cl. ............................... 192/89 B; 192/70.27; 267/161
[58] Field of Search .......................... 192/89 B, 70.27; 267/161, 162, 163

[56] References Cited

U.S. PATENT DOCUMENTS 2,100,464 11/1937 Almen et al. ..................... 74/574 X
4,039,354 8/1977 Schober ........................... 267/161 X

FOREIGN PATENT DOCUMENTS 1549247 7/1979 United Kingdom .............. 192/89 B

Primary Examiner—Stephen Hepperle
Attorney, Agent, or Firm—Peter K. Kontler

[57] ABSTRACT

A friction clutch wherein the diaphragm spring is installed between two annular seats which are carried by the clutch cover. At least one side of the spring has a set of radially extending reinforcing projections each of which extends in part into the annular main (outer) section and into one of the radially inwardly extending prongs. The respective seat has recesses for intermediate portions of such projections. The diaphragm spring is made of special spring steel and the recesses can be formed by deformation of and/or removal of material from the respective seat or seats.

23 Claims, 2 Drawing Sheets

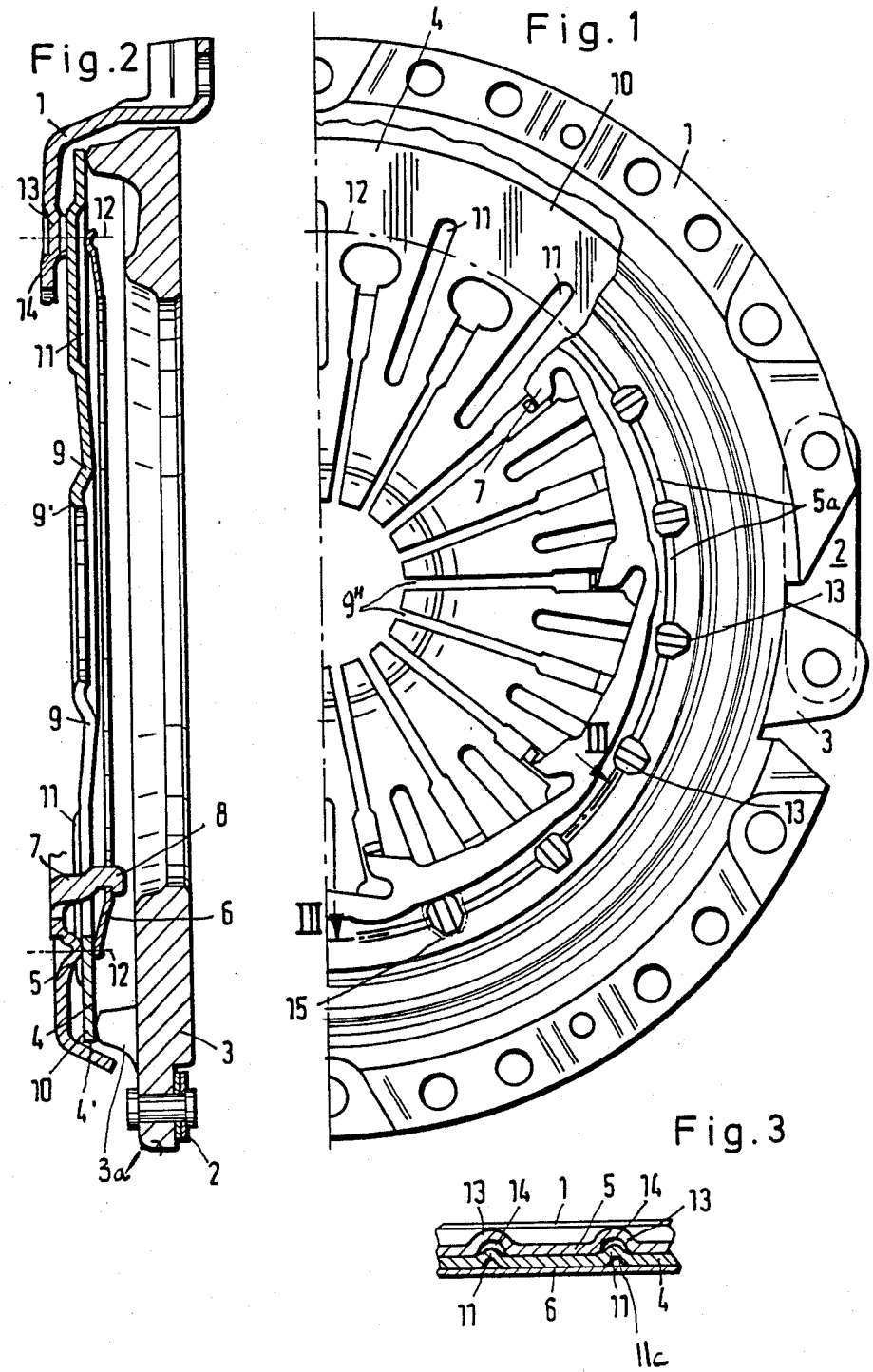

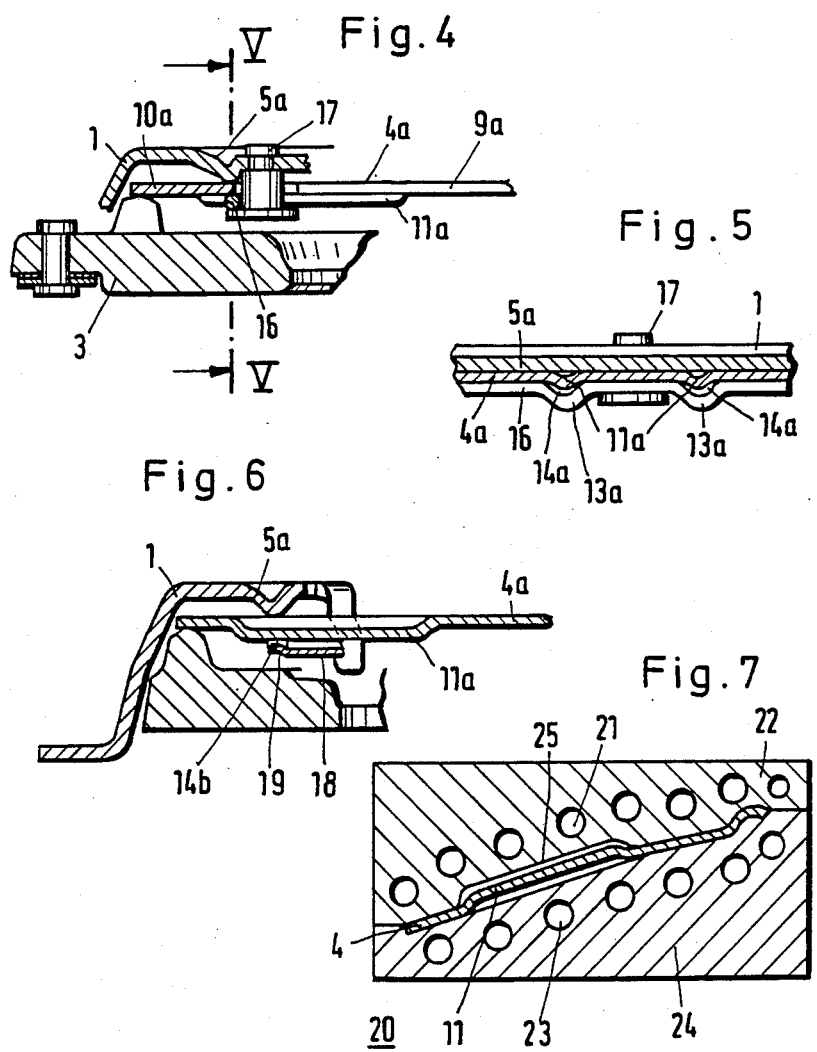

FRICTION CLUTCH AND METHOD OF MAKING A DIAPHRAGM SPRING THEREFOR

This application is a continuation, of application Ser. No. 896,118, filed Aug. 12, 1986, now abandoned which is a continuation of Ser. No. 833,569, filed Feb. 24, 1986, now abandoned, which is a continuation of Ser. No. 588,750, filed Mar. 12, 1984, now abandoned.

BACKGROUND OF THE INVENTION

The present invention relates to friction clutches of the type utilizing diaphragm springs wherein an annular main section surrounds radially inwardly extending prongs and wherein the tips of the prongs can be shifted axially of the diaphragm spring in order to change the conicity of the spring and to thereby engage or disengage the clutch. More particularly, the invention relates to improvements in friction clutches of the type wherein the diaphragm spring is fulcrumed for movement between two concentric annular seats which are provided on the cover or another suitable support of the clutch.

British Pat. No. 1,527,641 to Rawlings discloses a friction clutch wherein the diaphragm spring is secured to the cover by substantially annular wire members which surround the radially outermost portions of the prongs. The prongs are provided with ribs which extend radially inwardly from the respective wire members and terminate short of the annular main section of the spring. That side of the spring which faces away from the cover has a circumferentially extending recess for portions of the wire members, and the spring is fulcrumed for movement in the region of such recess. The ribs reinforce the major portions of the respective prongs but not the portions which are contacted by the respective wire members. Thus, the ribs cannot stiffen the prongs in the region where the spring pivots in order to change its conicity, i.e., in the region where the bending stresses are most pronounced. Moreover, and since the prongs are least rigid at the locations of merger into the main section, such radially outermost portions of the prongs are subject to maximum bending or flexing. This leads to premature fatigue of the material of the outermost portions of the prongs because such outermost portions are not reinforced and are thus least likely to stand alternating bending stresses when the diaphragm spring is dynamically stressed in actual use. Cracking or breaking of the prongs in a diaphragm spring of the type disclosed in the aforementioned British patent will result in premature expiration of the useful life of the spring and can necessitate discarding of the entire clutch. A further drawback of the just discussed patented clutch is that the circumferentially extending recesses in the outermost portions of the prongs interfere with proper movements of the diaphragm spring relative to its seats.

OBJECTS AND SUMMARY OF THE INVENTION

An object of the invention is to provide a friction clutch with a novel and improved diaphragm spring whose useful life is longer than that of heretofore known diaphragm springs.

Another object of the invention is to provide novel and improved seats for use in the friction clutch with the above outlined diaphragm spring.

A further object of the invention is to provide a novel and improved method of making a diaphragm spring for use in friction clutches and the like.

An additional object of the invention is to provide a friction clutch which embodies the improved diaphragm spring.

Another object of the invention is to provide a friction clutch which embodies the improved seats for the diaphragm spring.

Still another object of the invention is to provide a friction clutch which embodies the improved diaphragm spring and the improved seats therefor.

An ancillary object of the invention is to provide novel and improved reinforcing means for the main section and the prongs of a diaphragm spring.

A further object of the invention is to provide a novel and improved method of prolonging the useful life of a diaphragm spring.

Another object of the invention is to construct and assemble a diaphragm spring with other parts of a friction clutch in such a way that the prongs are less likely to break away from the main section than in heretofore known diaphragm springs.

A further object of the invention is to provide a diaphragm spring which is constructed in such a way that the forces which are applied to the prongs are transmitted to the main section in a more satisfactory way than in heretofore known diaphragm springs.

Another object of the invention is to provide a diaphragm spring wherein the tips of the prongs must be moved through a surprisingly short distance in order to engage or disengage the friction clutch.

An additional object of the invention is to provide a friction clutch wherein the diaphragm spring is fulcrumed for movement relative to its seats in a novel and improved way.

Another object of the invention is to provide a friction clutch which is constructed in such a way that the designer has greater freedom in selecting the radial distance between the radially innermost or radially outermost portion of the spring and the loci of engagement with the seats.

Still another object of the invention is to provide a friction clutch wherein the diameters of the seats can be selected at least substantially independently of the dimensions and/or locations of reinforcing means for the prongs of the diaphragm spring.

One feature of the invention resides in the provision of a friction clutch which comprises a support (e.g., the cover of the clutch), concentric first and second annular seats provided on the support, and a diaphragm spring having a main section located at least in part radially outwardly of the seats, a plurality of elongated prongs or fingers extending from the main section substantially radially inwardly of the seats and substantially radial reinforcing projections for at least some of the prongs. The projections are provided in the main section and in the respective prongs and extend between the seats. At least one of the seats has substantially complementary recesses for the reinforcing projections. A discrete reinforcing projection can be provided for each prong.

In accordance with one presently preferred embodiment of the invention, the recesses are provided in that seat which is nearer to the support. The projections then extend from that side of the diaphragm spring which faces the support. The seat which is nearer to the support can constitute an integral part of the support;

the recesses then preferably divide such seat into a plurality of discrete arcuate components.

If the recesses are provided only in that seat which is more distant from the support, the reinforcing projections can extend only from that side of the diaphragm spring which faces such seat. This seat can constitute a ring which is made of metallic or plastic wire. Alternatively, such seat can be cupped and can constitute a spring.

The recesses can be defined by deformed portions of the respective seat or seats, or they may constitute cutouts (i.e., they are then formed by removing material from the corresponding seat or seats).

The projections can include a first set facing the seat which is nearer to the support and a second set facing the other seat. Each of the seats is then provided with recesses for the corresponding set of projections. The projections preferably terminate short of the radially innermost and radially outermost portions of the diaphragm spring. The main section is normally an annulus which includes the radially outermost portion of the spring, and the radially innermost portion of the spring is defined by the tips of the prongs.

The extent to which the projections extend beyond the respective side or sides of the diaphragm spring can exceed, equal or approximate the thickness of the main section which normally matches or approximates the thickness of the prongs.

The diaphragm spring can consist of a special steel, particularly of annealed spheroidized cementite.

Another feature of the invention resides in the provision of a method of producing a diaphragm spring, particularly for use in friction clutches. The method comprises the steps of converting a piece of spheroidite spring steel into a diaphragm spring blank wherein an annular main section surrounds an annulus of substantially radially inwardly extending prongs, forming the blank with reinforcing projections which extend outwardly into but short of the radially outermost portion of the main section and inwardly into at least some but short of the radially innermost portions of the prongs, and hardening the blank.

The forming step can take place simultaneously with the converting step and can include deforming portions of the main section and of at least some prongs and/or removing material from the blank. The hardening step can include placing the blank between the two parts of a two-part hardening form of the type wherein one of the parts has an annular depression for the reinforcing projections. Such hardening step can include quenching the blank between the two parts of the form.

The novel features which are considered as characteristic of the invention are set forth in particular in the appended claims. The improved friction clutch itself, however, both as to its construction and the mode of making the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary end elevational view of a friction clutch which embodies one form of the invention;

FIG. 2 is an axial sectional view of the structure which is shown in FIG. 1;

FIG. 3 is a fragmentary sectional view as seen in the direction of arrows from the line III—III of FIG. 1;

FIG. 4 is a fragmentary axial sectional view of a modified friction clutch;

FIG. 5 is a sectional view as seen in the direction of arrows from the line V—V of FIG. 4;

FIG. 6 is a fragmentary axial sectional view of a third friction clutch; and

FIG. 7 is a sectional view of a two-part tool or form which can be used for the hardening of a diaphragm spring forming part of the improved friction clutch.

DESCRIPTION OF THE PREFERRED EMBODIMENTS

Referring first to FIGS. 1 to 3, there is shown a portion of a friction clutch comprising a cover 1 which is coupled to a pressure plate 3 by a set of leaf springs 2 and a diaphragm spring 4 whose radially outermost portion 4' abuts against a set of protuberances 3a on the pressure plate 3. The diaphragm spring 4 is fulcrumed for movement with reference to two concentric annular seats 5 and 6. The cover 1 constitutes a support for both seats and is integral with the seat 5. The seat 6 is more remote from the cover 1 than the seat 5 and constitutes an annular cupped or dished spring. In the embodiment of FIGS. 1 to 3, the seat 5 consists of a group of arcuate components 5' which are separated from each other by radially extending recesses 14. Such components are formed by stamping, i.e., by deforming the material of the cover 1 so that each component 5' constitutes a concavo-convex bulge whose convex side faces the diaphragm spring 4 and whose thickness equals or approximates that of the remainder of the cover. The seat 6 is held by the pallets 8 of claw-like retainers 7 which are integral with the cover 1 and maintain the seat 6 in axially stressed condition so that this seat can compensate for wear upon the two seats, for wear upon the diaphragm spring 4, as well as for manufacturing tolerances. The retainers 7 are lugs which are obtained by bending suitably configurated portions out of the general plane of the cover 1. Such lugs extend through the adjacent slots 9" between neighboring prongs 9 of the diaphragm spring 4 as well as through the central opening of the cupped seat 6. The pallets 8 engage that side of the seat 6 which faces away from the diaphragm spring 4.

In order to avoid or reduce the extent of flexing of the prongs 9 when the conicity of the diaphragm spring 4 is changed for the purpose of engaging or disengaging the clutch, the diaphragm spring 4 is provided with substantially radially extending reinforcing projections 11 in the form of straight elongated ribs, one for each of the prongs 9. Each rib 11 is disposed between the seats 5, 6 and extends radially outwardly toward but short of the radially outermost portion 4' as well as radially inwardly toward but short of the tips 9' of the respective prongs 9. Such tips together constitute the radially innermost portion of the diaphragm spring 4. The latter further comprises an annular main section 10 which defines the radially outermost portion 4' and is integral with the radially outermost portions of the prongs 11. The ribs 11 stiffen the prongs 9 and greatly reduce the likelihood of breakage of their radially outermost portions in response to repeated dynamic stressing of the diaphragm spring 4 in actual use of the friction clutch. Each rib 11 extends across that portion (12) of the diaphragm spring 4 which is disposed between the seats 5, 6 and each such rib extends into and is at least substantially complementary to one of the aforementioned radial recesses 14 in the seat 5. The recesses 14 contribute to more satisfactory mounting of the diaphragm spring 4 between the seats 5, 6. As mentioned above, such recesses are disposed between the neighboring arcuate components 5' of the seat 5, i.e., of that seat which constitutes an integral part of the cover 1.

The number of ribs 11 can be reduced to a fraction of the number of prongs 9. For example, it often suffices to provide a rib 11 in each second prong 9 of the diaphragm spring 4. Moreover, the recesses 14 need not be formed by deformation of the corresponding portions of the seat 5 but rather by removing the material of the seat 5 between its arcuate components 5'. Reference may be had to FIG. 1 which shows, by phantom lines, cutouts 15 which can be used in lieu of recesses 14. Such cutouts are formed in the material of the cover 1 prior to the formation of arcuate components 5' which constitute or form part of the seat 5.

The recesses 14 are surrounded by trough-shaped radially extending portions 13 of the cover 1.

An important advantage of the improved friction clutch, and more particularly of its diaphragm spring 4, is that the spring is reinforced not only in the region of the prongs 9 but also in the zone of transition (portion 12) from the radially outermost portions of the prongs into the main section 10. This is attributable to the provision of reinforcing ribs 11 which extend between the seats 5, 6 and into the respective prongs 9 as well as into the main section 10 of the diaphragm spring 4. These ribs 11 greatly increase the moment of resistance of the prongs 9 to bending stresses.

Another important advantage of the improved friction clutch is that the recesses 14 in the seat 5 provide greater freedom in selection of the diameter of the annular portion 12 than in the friction clutch of the British patent to Rawlings. This is due to the fact that the location where the diaphragm spring 4 is fulcrumed for movement relative to the seats 5 and 6 need not be located radially outwardly of the ribs 11. This, in turn, renders it possible to select an optimum transmission ratio and spring characteristic in spite of the provision of reinforcing ribs 11. The transmission ratio determines the extent of axial movement of the tips 9' of prongs 9 in order to ensure that the radially outermost portion 4' of the diaphragm spring 4 (which latter can be said to constitute or to act not unlike a two-armed lever) will effect or allow for requisite axial movement of the pressure plate 3 relative to the clutch disc (not shown) of the friction clutch. Moreover, the designer of the friction clutch has greater freedom in selection of the dimensions of the main section 10 of the diaphragm spring 4. As a rule, the latter will be provided with a discrete reinforcing rib 11 for each of its prongs 9. This entails a pronounced reduction or elimination of lift-off losses.

The recesses 14 of the seat 5 on the cover 1 can be said to constitute radially extending tunnels which cross the circumferentially extending tunnel defined by the portions 13 of the cover 1 at that side of the latter which faces toward the diaphragm spring 4. It is presently preferred to dimension the ribs 11 and/or the recesses 14 in such a way that the ribs are received in their recesses with a small amount of play, i.e., to provide narrow air gaps. This facilitates the movements of the diaphragm spring 4 relative to the seats 5, 6 when the tips 9' of the prongs 9 are caused or allowed to move axially of the diaphragm spring in order to engage or disengage the friction clutch.

If the diaphragm spring is of the type wherein the main section 10 is formed with radially outwardly extending lugs which abut against the protuberances 3a of the pressure plate 3 and which are aligned with the prongs 9, each reinforcing rib 11 can extend close to the tip 9' of the respective prong 9 at its radially innermost end and into the corresponding lug at its radially outermost end. This results in adequate reinforcement of the entire main section 10. An advantage of the feature that the ribs 11 terminate short of the radially innermost and outermost portions of the diaphragm spring 4 is that the radially innermost portions or tips 9' of the prongs 9 can be maintained in full surface-to-surface contact with a bearing or a like device which is used to change the conicity of the diaphragm spring 4 in order to engage or disengage the friction clutch, and also that the radially outermost portions of the ribs 11 do not interfere with satisfactory surface-to-surface contact between the diaphragm spring 4 and the pressure plate 3. In other words, the ribs 11 cannot adversely influence the cooperation between the prongs 9 and the declutching means and/or the cooperation between the main section 10 or its lugs and the pressure plate 3.

The height of the ribs 11 can be selected practically at will within a wide range so as to equal, approximate or exceed the thickness of the main section 10 and prongs 9.

Referring now to FIGS. 4 and 5, there is shown a portion of a modified friction clutch which comprises a cover or support 1, a diaphragm spring 4a including an annular main section 10a and radially inwardly extending prongs 9a, and a pressure plate 3 which is contacted by the radially outermost portion of the diaphragm spring 4a. The latter is mounted between a circumferentially complete annular seat 5a which is an integral part of the cover 1 and a second seat 16 which is a wire ring secured to the cover 1 by a set of equidistant rivets 17. The diaphragm spring 4a has a plurality of straight elongated radially extending reinforcing projections in the form of ribs 11a extending from that side of the diaphragm spring which faces the wire ring 16. The purpose of the ribs 11a is the same as that of the ribs 11.

In order to ensure optimal mounting of the diaphragm spring 4a between the seats 5a and 16, the latter is formed with radially extending recesses 14a, one for each of the ribs 11a. The recesses 14a are formed by deforming the ring 16 so that the latter comprises a set of equidistant concavo-convex trough-shaped portions 13a whose concave sides face the spring 4a and whose convex sides face away from the cover 1. Each portion 13a partially surrounds an intermediate part of the respective rib 11a.

In the embodiment which is shown in FIG. 6, the seat 19 which is more remote from the cover 1 is provided on a cupped annular spring 18. The diaphragm spring 4a between the seats 5a and 19 has radially extending reinforcing projections in the form of straight ribs 11a portions of which extend into complementary recesses 14b of the seat 19. The cupped spring 18 is formed with deformed arcuate components which extend between the recesses 14b and together constitute the seat 19. If desired, the recesses 14b can constitute cutouts, i.e., they can be formed by removing some material of the cupped spring 18.

The feature that the seat (6 or 19) which is more distant from the cover 1 constitutes or forms part of a cupped spring which is mounted on the cover 1 in prestressed condition is desirable and advantageous because this compensates for manufacturing and/or assembling tolerances and/or for wear upon the constituents of the friction clutch. Reference may be had to commonly owned U.S. Pat. No. 3,811,544 granted to Paul Maucher. As mentioned above, the recesses in the seat 19 can be formed by deforming the material of the cupped spring 18 and/or by removing some material from such spring.

It is further within the purview of the invention to provide the diaphragm spring 4 or 4a with two sets of reinforcing projections in the form of ribs (11 or 11a) or the like. For example, ribs which extend beyond one side of the diaphragm spring can alternate with ribs which extend beyond the other side of the diaphragm spring. In such a friction clutch, one of the seats has recesses for one set of ribs and the other seat has recesses for the other set of ribs. Such seats and such a diaphragm spring can be used with advantage in many types of friction clutches for motor vehicles or the like.

It is further possible to provide each of the seats with a set of recesses even if all of the reinforcing ribs extend beyond one and the same side of the diaphragm spring. The provision of recesses in the seat which does not receive portions of the ribs does not interfere with the operation of the friction clutch because the ribs are normally formed by deforming the material of the diaphragm spring so that the latter has grooves in register with the reinforcing ribs and it cannot abut against the adjacent seat in the region of such grooves anyway. This can be seen in FIG. 3 where the grooves 11c of the spring 4 are in register with the ribs 11; therefore, the provision of recesses in the seat 6 adjacent to the grooves 11c would not adversely affect the operation of the friction clutch. The provision of recesses in the seat 6 is desirable because it allows for more convenient insertion of the diaphragm spring between the two seats and for more convenient mounting of the seat 6 in an optimum angular position.

The starting material of the diaphragm spring 4 or 4a is preferably steel, particularly spring steel such as annealed spheroized cementite belonging to the group of alloyed or unalloyed structural steels, or a special steel. This renders it possible to provide the diaphragm spring 4 or 4a with reinforcing projections by cold forming.

FIG. 7 shows a combined hardening and quenching form or tool 20 which includes a first part 22 having cooling channels 21 and a second part 24 having cooling channels 23. In order to produce a diaphragm spring 4 (or 4a), a heated metallic blank, which already comprises a main section, a set of prongs and reinforcing projections 11 for some or all of the prongs, is inserted between the parts 22, 24 of the form 20 which is thereupon closed by moving the parts 22, 24 toward each other to impart to the blank a frustoconical shape and to simultaneously quench the material of the blank. The part 22 has an annular depression 25 which receives the reinforcing projections 11 (or 11a) of the thus obtained diaphragm spring 4 (or 4a). This simplifies the hardening of the blank because the blank can be introduced between the parts 22, 24 in any desired angular position.

The conversion of a sheet of spring steel into a blank which exhibits a main section and a set of radially extending prongs can take place simultaneously with the formation of ribs by stamping or in another suitable way. The ribs can also be formed simultaneously with hardening of the blank, i.e., in the space between the parts 22, 24 of the form 20.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. In a friction clutch, the combination of a support; concentric first and second annular seats provided on said support; and a diaphragm spring having first and second sides respectively facing said first and second seats, a main section located at least in part radially outwardly of said seats, a plurality of elongated prongs extending from and main section substantially radially inwardly of said seats, and substantially radial reinforcing projections for at least some of said prongs, said projections being provided in said main section and in the respective prongs and extending from at least one of said sides between said seats, at least that one of said seats which faces said one side having recesses for said projections, said one side of said spring and the respective seat contacting each other at one side of each of said projections, as considered in the circumferential direction of said seats.

2. In a friction clutch, the combination of a support; concentric first and second annular seats provided on said support; and a diaphragm spring having first and second sides respectively facing said first and second seats, a main section located at least in part radially outwardly of said seats, a plurality of elongated prongs extending from said main section substantially radially inwardly of said seats, and substantially radial reinforcing projections for at least some of said prongs, said projections being provided in said main section and in the respective prongs and extending from at least one of said sides between said seats, at least that one of said seats which faces said one side having recesses for said projections so that such projections are out of contact with the recessed seat, said one side of said spring and the respective seat contacting each other at least at one side of each of said projections, as considered in the circumferential direction of said seats.

3. The combination of claim 2, wherein said support includes a cover.

4. The combination of claim 2, wherein said diaphragm spring comprises a discrete reinforcing projection for each of said prongs.

5. The combination of claim 2, wherein said first seat is nearer to and said second seat is more distant from said support, said recesses being provided in said first seat.

6. The combination of claim 1, wherein said projections extend from the first side of said spring.

7. The combination of claim 5, wherein said first seat is integral with said support.

8. The combination of claim 7, wherein said recesses subdivide said first seat into a plurality of discrete arcuate components.

9. The combination of claim 2, wherein said first seat is nearer to and said second seat is more distant from said support, said recesses being provided in said second seat.

10. The combination of claim 1, wherein said projections extend from the second side of said spring.

11. The combination of claim 10, wherein said second seat comprises a wire ring.

12. The combination of claim 10, wherein said second seat is cupped.

13. The combination of claim 12, wherein said second seat is a spring.

14. The combination of claim 2, wherein said recesses are defined by deformed portions of said one seat.

15. The combination of claim 2, wherein said recesses are cutouts.

16. The combination of claim 2, wherein said first seat is nearer to and said second seat is more distant from said support, first and second sides respectively facing said first said projections including first and second sets respectively extending from the first and second sides of said spring, said first seat having recesses for the projections of said first set and said second seat having recesses for the projections of said second set.

17. The combination of claim 2, wherein said diaphragm spring includes radially innermost and radially outermost portions and each of said projections terminates short of said innermost and outermost portions.

18. The combination of claim 17, wherein said main section has an annular shape, said innermost portion of said diaphragm spring being defined by said prongs and said outermost portion of said diaphragm spring being defined by said main section.

19. The combination of claim 2, wherein said main section and said prongs have a predetermined thickness and said diaphragm spring has first and second sides respectively facing said first and second seats, said projections extending from at least one of said sides through distances equaling or approximating said thickness.

20. The combination of claim 2, wherein said main section and said prongs have a predetermined thickness and said diaphragm spring has first and second sides respectively facing said first and second seats, said projections extending from at least one of said sides through distances exceeding said thickness.

21. The combination of claim 2, wherein said diaphragm spring contains steel which is annealed spheroidized cementite steel.

22. A method of producing a diaphragm spring, particularly for use in friction clutches, comprising the steps of converting a piece of steel which is annealed to spheroidized cementite steel into a diaphragm spring blank wherein an annular main section surrounds an annulus of substantially radially inwardly extending prongs; forming the blank with reinforcing projections which extend into at least some of the prongs; and hardening the blank.

23. The combination of claim 2, wherein the main section of said diaphragm spring includes substantially flat portions alternating with said reinforcing projections in the circumferential direction of the main section.

* * * * *